United States Patent [19]
Rentzepis

[11] 3,730,629
[45] May 1, 1973

[54] TIME RESOLVED SPECTROMETER

[75] Inventor: Peter Michael Rentzepis, Millington, N.J.

[73] Assignee: Bell Telephone Laboratories, Incorporated, Murray Hill, N.J.

[22] Filed: Dec. 24, 1970

[21] Appl. No.: 101,208

[52] U.S. Cl..................................356/74, 356/98
[51] Int. Cl..........................G01j 3/02, G01j 3/42
[58] Field of Search...........356/74–98; 350/150, 161

[56] References Cited

UNITED STATES PATENTS

| | | | |
|---|---|---|---|
| 3,408,593 | 10/1968 | Hurwitz | 350/150 X |
| 3,519,328 | 7/1970 | Grossman | 350/150 |
| 3,573,449 | 4/1971 | Maloney | 350/161 |

OTHER PUBLICATIONS

Lawrence et al., The Physical Review Vol. 35, No. 4, February 15, 1930, pages 396–407

Gordon et al., The Journal of the Optical Society of America Vol. 40, No. 12, December 1950, pages 852 and 853.

Primary Examiner—Ronald L. Wibert
Assistant Examiner—F. L. Evans
Attorney—R. J. Guenther and Edwin B. Cave

[57] ABSTRACT

Apparatus arrangements for yielding either absorption or emission spectral data with superimposed time resolution are described. Such apparatus may serve in the manner of any of the various spectrometer designs and may yield information of the variety, bandwidth, accuracy and precision characterized by conventional instruments. In a particular embodiment, time resolution, which may range over a scale of from a few hundred picoseconds or more, is evidenced in terms of relative displacement of portions of the spectra. Displacement proportional to time in such embodiment results from the progressive opening of a electrooptic shutter under the influence of a traveling light pulse.

6 Claims, 3 Drawing Figures

PATENTED MAY 1 1973　　　　　　　　　　　　　　　　3,730,629

INVENTOR
P. M. RENTZEPIS
BY
ATTORNEY

TIME RESOLVED SPECTROMETER

BACKGROUND OF THE INVENTION

1. Field of the Invention

The invention is concerned with means for yielding spectral data, either absorptive or emissive. Such means, ordinarily known as an optical spectrometer, is of interest both in laboratory and industrial applications.

2. Description of the Prior Art

Increasing interest in sophisticated circuit elements, including those concerned with electromagnetic radiation in the visible and near-visible spectrum (i.e. 10 A – 100,000 A), have resulted in concomitant advances in laboratory apparatus. Such apparatus is useful in the characterization of materials for use in such elements. It is valuable at a number of levels from fundamental to industrial. A particular type of apparatus of significance is known as the spectrometer (see Vol. 65, *Proceedings of the Physical Society of London*, p. 699 (1933)), and various designs of this instrument are considered absolutely vital to an understanding of and compounding of a variety of materials. Both fundamental knowledge and technological advance in a variety of fields, including semiconductivity, magnetism, optics, phosphorescence, stimulated emission, etc., are heavily indebted to the spectrometer.

As the arts and technologies have grown, advances have been made in the spectrometer which have resulted in improvement in sensitivity, in signal-to-noise ratio, in bandwidth, etc. Varieties of this popular instrument are designed to optimize particular spectral characteristics of concern. Accordingly, spectrometers of one category may be particularly useful in the vacuum ultraviolet, another in the infrared. A variety of different designs are in use depending on intended use. For example, certain of these may use prisms and certain gratings, depending on whether a linear or a nonlinear frequency response is designed.

All spectrometers yield frequency information regardless of whether the spectral data is that of absorption or emission. In addition, certain designs result in readout which is amplitude dependent.

Workers in a variety of fields of inquiry are concerned with spectral characteristics not yielded by optical spectrometers now available. Perhaps most significant among these characteristics is time resolution. The usual laboratory spectrometer integrates information over the measurement period and yields a mere summation of the events portrayed. There is no differentiation in point of time, for example, as between a first photon absorption or emission (which may take place in about $10^{-13}$ seconds) and a third photon absorption or emission (which may not occur until a lapse of $10^{-3}$ seconds). Time resolution of spectral data is generally accomplished by use of photomultipliers or photodiodes. (see Vol. 7, Chemical Physics Letters, p. 57 (1970)). Due to limitations both of such detectors and ancillary circuitry, such resolution is not likely to be better than about $10^{-9}$ seconds.

Clearly, an expedient means of time resolution would be of assistance to the spectroscopist in a variety of fields.

SUMMARY OF THE INVENTION

In accordance with the invention, time resolution of spectral data is introduced in an optical spectrometer by use of a particular type of shutter between the output from the sample and the detecting means of the spectrometer. This shutter, here denoted a "progressive" shutter, is so arranged as to be rendered transmitting for the information containing beam only over progressive portions during a time period of concern. Three portions are small relative to the beam diameter so that only specific parts of the beam are passed at any given time. In accordance with a particular embodiment, portions of a shutter are rendered transmissive in a direction orthogonal to the beam direction. The effect is a displacement of different parts of the observed spectrum so that parts resulting from high order photon transitions or other delayed mechanisms are displaced from spectral lines associated with more rapid transitions in the direction of progressive opening of the shutter.

The most ample embodiment, in accordance with the invention, may vary from a conventional spectrometer only by insertion of the progressive shutter. In this embodiment, the shutter may take the form of a Kerr cell between crossed polarizers which may be rendered progressively transmissive by a split portion of the exciting beam itself. The principle of operation using a Kerr cell is described in 15 *App. Sys. Let.* 192 (1969). Briefly the cell is either unpolarized or is polarized in such direction that the beam is blocked by the polarizers in the "normal" condition. Propogation of light down the cell polarizes the cell medium in such direction as to cause sufficient rotation of the beam (usually 90°) and permit transmission. This "rotation"is the familiar effect due to induced birefringence. Illumination of the cell by the "shutter" beam and the beam from the sample may be simultaneous or displaced to record particular events of interest.

Kerr cells may be replaced by other electrooptic shutters as, for example, those operating on the Pockel's effect, by acousto-optic deflectors utilizing traveling elastic pulses, or varying frequency signals, or other arrangements, the general requirement being a time-dependent displacement of the sensed spectral information. The term "shutter" is intended to encompass elements which prevent transmission of radiation to a particular (and varying) portion of a sensing element whether accomplished by selective transparency (as by the Kerr cell arrangement) or by deflection (as by an electrooptic deflector). More complex variations may combine moving detectors or recording media; may utilize pulse trains, sinusoidal waves or other continuous waves for actuating the progressive shutter or for the exciting light, or for both.

The invention is considered to be of chief significance for the measurement of relatively short time periods, i.e., below the millisecond range, usually in the picosecond range. Such time resolution, while of obvious interest in the study of pulsed information, is also significant in terms of wave fronts or other segments of radiation of greater duration.

DETAILED DESCRIPTION

The Figures

Figure 1:
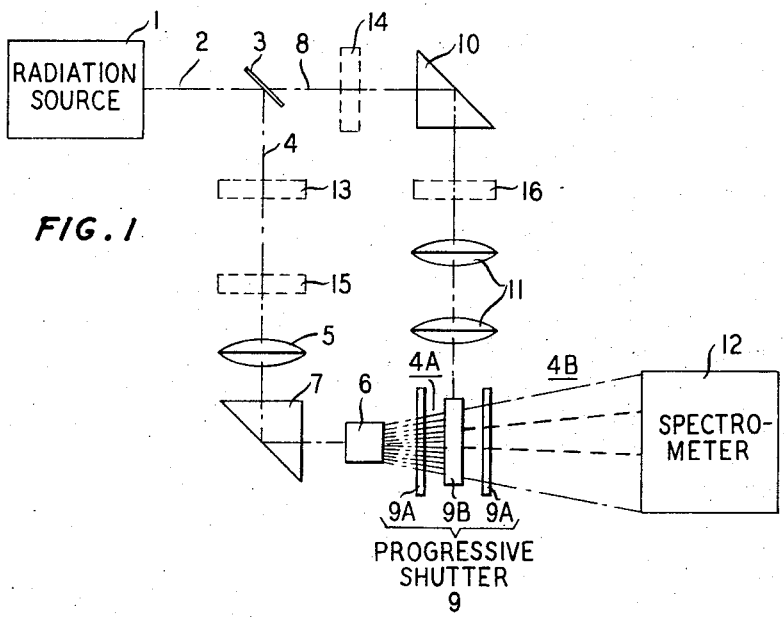
FIG. 1 is a schematic representation of a spectrometer equipped with a progressive shutter, in accordance with the invention, for producing time resolved spectral information.

In the apparatus of FIG. 1, both sample excitation and progressive shutter operation result from but a single radiation source 1. Ignoring elements shown in phantom, beam 2, emanating from source 1, is split by a beam splitter, such as partially reflecting reflector 3, into exciting beam 4 and "shutter" beam 8. Exciting beam 4 passes through lens 5 and is directed to sample 6 by means of refracting or reflecting means 7. Beam 4A leaving sample 6 and now containing absorption and/or emission information passes through progressive shutter 9 composed of crossed polarizers 9A and Kerr cell 9B. Time related beam 8 (either simultaneous, lagging, or leading) is made incident on cell 9 by means of refracting or reflecting means 10 and colliminating lenses 11 during a period which overlaps the illumination period by the beam leaving the sample 6. Considering cell 9 to be a Kerr cell or a Pockel's cell or an element dependent upon a combination of these effects, and elements 9A to be crossed polarizers, the effect of beam 8 is to progressively polarize the medium of which the cell is composed in such direction as to locally "rotate" the polarization plane of beam 4A and make the shutter more transmissive to the illuminating beam 4A over the localized portion of the cell which is coupled with beam 8 at the instant of concern.

In a particular embodiment, radiation emanating from source 1 is in the form of one or more pulses and only a relatively small traveling portion of shutter 9 is transmissive at any instant. In another variation, radiation from source 1 is continuous and the continuity is retained at least in beam 8 so that a growing portion of shutter 9 is rendered transmissive. As depicted, the information-containing radiation is a series of rays 4A illuminating cell 9 and passing therethrough. Each of rays 4A, since it evolves from sample 6, represents either unabsorbed energy or emitted energy from the sample 6. Upon passing through cell 9, certain of the rays are polarized in such direction as to be transmitted through the analyzer (or element 9A). Since such polarization occurs progressively, transmitted rays depicted as solid lines 4B are spacially displaced. The final element in the apparatus depicted is spectrometer 12. Aside from possible increased slit size to accommodate the full illuminating beam diameter, this element may take the form of any conventional spectrometer. Readout may utilize photomultipliers, spectroscopic plates, or other means.

Three additional elements are shown in phantom. Two of these, 13 and 14, are light valves, for example, electrooptic or magneto-optic elements, in combination with one or more polarizing elements. Either or a combination of the two are used to terminate a pulsed train or wave at some desired point. For example, it may be desirable to subject sample 6 to two or more pulses of existing radiation while utilizing a single pulse for actuating the progressive shutter. Alternatively, lifetimes of absorptive or radiative states of sample 6 may exceed the time span corresponding with feasible cell dimension and repetitive shutter action (possibly accompanied by moving spectrometer recording medium) may be useful. Elements 15 and 16 are cut-off filters designed to restrict the radiation (either excitation or shutter beams) to narrow bandwidth. Such elements may be fixed or variable. In the latter case, either or both may be provided with means for sweeping frequency during single or successuve pulses or periods of radiation.

Figure 2:
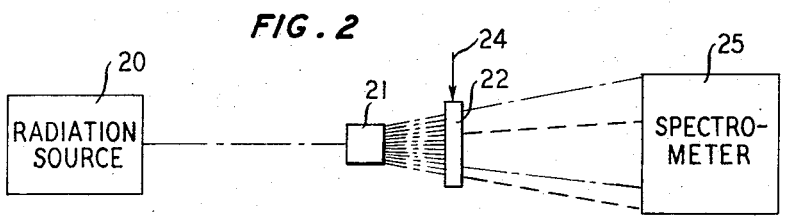
FIG. 2 is a schematic representation of an apparatus alternative to that of FIG. 1.

The apparatus of FIG. 2 is shown in more generalized form. This apparatus also consists of a radiation source 20, a sample 21, a progressive shutter 22, and means 24 for progressively actuating the shutter, with means for illuminating spectrometer 25 with radiation for which shutter 22 is transmissive. Whereas the apparatus of FIG. 1 depends for its operation on the time relationship of two split portions of the same radiation, the apparatus of FIG. 2 may utilize completely distinct sources of excited energy and shutter energy. For example, element 24 may be an electrooptic deflector element such as a prism with means, not shown, for varying the index of refraction so as to produce time-dependent deflection. Alternatively, element 24 may, again, be a Kerr cell or a Pockel's cell with progressive transmittance being produced by a separate energy source which may or may not be in some specific time relationship to the exciting radiation.

Spectrometer 25 or the detecting portion thereof may be provided with means, not shown, for displacing the detecting means relative to the information-containing radiation. Such means may utilize, for example, an acousto-optic deflector or mechanical means. This type of arrangement is of particular interest where the time span of concern is greater than of the order of 100 picoseconds. Where such variation is used, displacement may be continuous or stepwise with each step corresponding with a successive cycle of radiation emanating from shutter 22.

Figure 3:
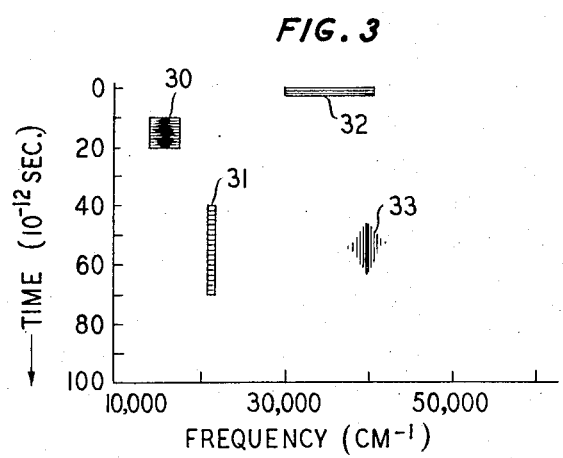
FIG. 3, on coordinates of time in picoseconds and frequency in wave numbers (wavelength expressed in reciprocal centimeters), is an illustrative spectrogram resulting from use of the inventive apparatus and containing three types of information, frequency, amplitude, and time.

FIG. 3 is one form of illustrative spectrogram which may be produced by apparatus of the invention. In this example, coordinates are time in picoseconds on the ordinate and frequency in wave numbers on the abscissa. Four special bands are shown for illustration. Each of these bands, denoted 30 through 33, is illustrative of a type of response which may result from a given sample. Frequency and time are readily ascertained in terms of the ordinate units, while relative amplitude is evidenced in terms of density of the pattern. So, for example, band 30 extends over a wavelength range of from about 12,000 to 14,000 cm$^{-1}$ and over a time interval of about 10 picoseconds initiating at about $15 \times 10^{-B12}$ seconds. It is seen that the amplitude of band 30 peaks at a frequency of about 13,000 cm$^{-1}$ with substantial drop-off on either side. Band 31 extends over a substantially shorter frequency bandwidth (about 1,000 cm$^{-1}$), initiates somewhat later (at about $40\times10^{-12}$ seconds) and is of duration approximating $30\times10^{-12}$ seconds. The intensity of this band is less than that of the peak of band 30 but varies little over its detected time interval (such bands which do not exhibit a distinct maximum are known as diffuse bands). Band 32 is of large amplitude, relatively broad frequency bandwidth, but of relatively short duration. It is, however, initiated very closed to time zero. Band 33 is a line spectrum and contains all the information usually found in such spectrum, of course, as supplemented by the time information described in conjunction with the other bands shown.

Examples

The following detailed description is largely in terms of two examples. Both experiments utilize a neodymium glass laser radiation source and one additionally utilizes a second harmonic generator. Both sources were pulsed. Both examples utilized $CS_2$ Kerr cells. The length of the cells was of the order of a few centimeters so that pulsed traversal time was of the order of tens of picoseconds (refractive index equals about 1.5). The first example resulted in a 10:1 beam split with the greater amount of energy being utilized to open the progressive shutter. In the second example, splitting was on the basis of frequency with the fundamental 1.06 micrometer radiation being utilized to actuate the shutter while the second harmonic 0.53 micrometer radiation illuminated the sample.

While the above considerations and others appearing in the examples are of interest to the experimenter utilizing the particular elements and materials involved in the experiments, other arrangements including expansion or contraction of time or spectral intervals, and others of which have been described in the preceding section, may be more suitable for other procedures. The only general requirement is that progressive transmittance be produced in the progressive shutter during a time interval overlapping that of illumination by the shutter of radiation emanating from the sample.

Example 1

This example utilized apparatus of the nature depicted in FIG. 1. It included a progressive shutter consisting of a 0.1mm $CS_2$ liquid cell located between a pair of crossed polarizers. The shutter was opened by a picosecond pulse of the first harmonic of a Nd$^{+3}$ glass mode locked laser. The shutter admitted light through different points along the propagation of the picosecond laser pulse for a time of 1.8 picoseconds which was determined by the rotational relaxation rate of the solvent molecules. Time dependence of the emission of an organic dye molecule in solution was monitored on a total time scale of about 20 picoseconds with a time resolution of 2 picoseconds. The dye (r-hodamine 6G (4 Oxo-2-thioxothiazolidine)- concentration $\approx 10^{-4}$M) in acetone solvent was excited by a picosecond pulse of the second harmonic of a mode locked Nd$^{+3}$ glass laser, the resulting emission being fed through the progressive shutter into the entrance slit of a spectrometer. Second harmonic was generated by use of a KDP crystal (potassium dihydrogen phosphate). The pulses were separated with the second harmonic (about 0.53 micrometer) inducing the excitation which, in this experiment, induced stimulated emission. This emitted radiation passed through the shutter during the time and at the point where the shutter was opened. The fundamental emission of the laser (about 1.06 micrometer) provided the time resolving mechanism. The resulting time versus wavelength was of the form shown in FIG. 3. The second harmonic which arrived simultaneously with the shutter opening pulse therefore started at $t=0$. There was, then, essential absence of stimulated emission for the period of about 6 picoseconds (upper limit) before the onset of the stimulated emission from the dye which had a duration of about 10 picoseconds.

Example 2

Using a longer (5 cm) $CS_2$ cell or substituting the $CS_2$ in the optical shutter by a liquid characterized by a longer rotational relaxation time (i.e., nitrobenzene), it was possible to resolve the time response of the normal or Raman fluorescence which is characterized by a decay time of about 1.2 picoseconds. The reliability of the system was further checked by performing other experiments on known systems such as Q-switching dyes.

What is claimed is:

1. Apparatus including first means for illuminating a sample to be analyzed with pulsed electromagnetic radiation and second means sensitive to spectral information contained in radiation departing said sample, said second means consisting essentially of a spectrometer, characterized in that a shutter is interposed between said sample and said second means, said shutter being provided with third means for rendering successive portions of said shutter transmissive to said radiation during the lifetime of said radiation in which said third means comprises a means for launching electromagnetic wave energy and in which said first means and said third means comprise means for directing separate portions of electromagnetic energy emanating from a single radiation source.

2. Apparatus of claim 1 in which said electromagnetic wave energy consists of at least one pulse.

3. Apparatus of claim 2 in which said pulse bears a fixed time relationship to the pulsed radiation of said first means.

4. Apparatus of claim 3 in which the radiation from said first and third means are of different wavelength.

5. Apparatus of claim 3 in which the radiation from said first and third means are of the same wavelength.

6. Apparatus of claim 1 in which the said shutter is at least partially operative by reason of the Kerr effect.

* * * * *